(12) United States Patent
Chang et al.

(10) Patent No.: US 8,704,190 B2
(45) Date of Patent: Apr. 22, 2014

(54) RADIATION DETECTION SIGNAL PROCESSING METHOD AND SYSTEM

(75) Inventors: Chung-Hung Chang, Taoyuan County (TW); Sheng-Pin Tseng, Taoyuan County (TW); Meei-Ling Jan, Taoyuan County (TW)

(73) Assignee: Institute of Nuclear Energy Research Atomic Energy Council, Executive Yuan, Taoyuan County (TW)

( * ) Notice: Subject to any disclaimer, the term of this patent is extended or adjusted under 35 U.S.C. 154(b) by 99 days.

(21) Appl. No.: 13/547,182

(22) Filed: Jul. 12, 2012

(65) Prior Publication Data
US 2013/0284941 A1  Oct. 31, 2013

(30) Foreign Application Priority Data
Apr. 27, 2012  (TW) .............................. 101115138 A

(51) Int. Cl.
*G01T 1/16* (2006.01)
*G01T 1/164* (2006.01)
*G01T 1/24* (2006.01)
*G01T 1/29* (2006.01)

(52) U.S. Cl.
CPC . *G01T 1/16* (2013.01); *G01T 1/248* (2013.01); *G01T 1/1647* (2013.01); *G01T 1/2985* (2013.01)
USPC ...................................... 250/394; 250/363.04

(58) Field of Classification Search
CPC ......... G01T 1/16; G01T 1/248; G01T 1/1647; G01T 1/2985
USPC ........................................................ 250/394
See application file for complete search history.

(56) References Cited

U.S. PATENT DOCUMENTS

| 5,608,221 | A * | 3/1997 | Bertelsen et al. ........ 250/363.03 |
| 2003/0160175 | A1* | 8/2003 | Nygard et al. ............ 250/370.09 |
| 2008/0203309 | A1* | 8/2008 | Frach et al. .................. 250/362 |
| 2009/0267941 | A1* | 10/2009 | Von Berg et al. ............. 345/423 |
| 2012/0025091 | A1* | 2/2012 | Wu et al. ....................... 250/394 |

\* cited by examiner

*Primary Examiner* — Marcus Taningco
(74) *Attorney, Agent, or Firm* — WPAT, PC; Justin King

(57) ABSTRACT

A radiation detection signal processing method and a radiation detection signal processing system using the method are provided, which combine trigger signals and time mark information. The method includes: providing a radiation detection signal processing system having a plurality of front-end detectors, where each front-end detector detects a radiation event to generate a corresponding energy signal; generating a corresponding trigger signal according to the corresponding energy signal; generating a first signal and a second signal according to all trigger signals; and obtaining time differences among the trigger signals according to the first signal and the second signal, converting the time differences into a set of time marks, merging all of the trigger signals and the set of time marks into a hybrid time signal, and transmitting the hybrid time signal to a hybrid event coincidence detection circuit.

10 Claims, 3 Drawing Sheets

RADIATION DETECTION SIGNAL PROCESSING METHOD AND SYSTEM

BACKGROUND OF THE INVENTION

1. Field of Invention

The present invention relates to a coincidence event identification technology, and in particular, to a radiation signal processing method and a radiation signal processing system which combine trigger signals and time marks.

2. Related Art

Positron emission tomography (PET) uses an isotopic drug having a small amount of radiation to perform biomedical detection. After glucose having a radioactive medicament enters an organism through intravenous injection, a large amount of the medicament is absorbed by malignant cells. When a positron in a decaying process and an electron in a cell collide to mutually counteract and destroy each other to generate an annihilation effect, the masses of the positron and the electron disappear, and two γ-rays are released in opposite directions and form an angle of 180°. The energy of each γ-ray is 511 keV. By detecting these paired γ-rays, a PET scanner reestablishes a distribution situation of a positron drug in a tissue or an organ to obtain a desired image. Therefore, how to accurately identify the paired γ-rays in real time is a problem currently concerned by those in the industry.

The existing technologies for identifying paired γ-rays may be classified into three types: (1) a time mark method, (2) a trigger signal AND logic method, and a hybrid method. In the time mark method, an event coincidence detection system circuit sorts time marks sent by all detectors in a fixed time cycle, and computes time mark difference values between the paired detectors to determine whether a time mark difference value of a detector module pair is within a preset time coincidence window. If a time mark difference value is smaller than a numerical value of the time coincidence window, it is determined that a coincidence event occurs to this pair. This method can provide accurate time resolution, but the complexity in implementation increases as the lengths of time mark digital values increase, which causes poor real time performance of the detection system circuit.

In the trigger signal AND logic method, trigger signals output by all possibly paired detectors are detected by using an "AND" logic gate to see whether the trigger signals are simultaneously generated. An approach is to find all possible detector pair combinations in advance, and trigger signals of two detectors in each combination pass through an AND logic gate. Only when the two paired trigger signals are both at high levels, the AND logic gate produces a high level to determine that a coincidence event occurs to this pair. This method is implemented in real time and is fast and simple, which saves the sorting of paired events in the time mark method, thereby greatly reducing the system complexity and making it easy to implement on a hardware circuit. However, the magnitude of the time coincidence window is decided by pulse widths of the trigger signals, so that it is not suitable for real time changing and adjustment, and the trigger signals are easily interfered and influenced by noises of circuits and components.

Finally, in the hybrid method, preliminary filtering is performed by the conventional trigger signal AND logic method, and for paired modules after the filtering, the time mark method is used to finally identify a coincidence event. An approach is to firstly synchronize an original trigger signal output by each detector module with a system main clock to obtain a synchronized trigger signal. All possible detector module pair combinations are found, and synchronized trigger signals of two paired modules in each combination pass through an AND logic gate. When the two paired synchronized trigger signals are both at high levels, the AND logic gate produces a high level. Accordingly, it is preliminarily determined that a coincidence event possibly occurs to this pair. For preliminarily selected candidate paired modules of the coincidence event, coincidence event identification is performed by using the time mark method in a second stage. Time marks output by the selected paired modules are analyzed in detail to finally decide whether the coincidence event truly occurs.

To sum up, the hybrid technology for identifying paired γ-rays in the prior art is to perform the preliminary filtering by the conventional trigger signal AND logic method, and use the time mark method to finally identify the coincidence event after the filtering. Though the real time performance of the conventional trigger signal AND logic method and the accuracy of the conventional time mark method are achieved at the same time, each detector in the system is matched with a set of a pulse discrimination circuit and a time-to-digital converter (TDC), which need a large quantity of chips and memories, thereby causing a waste of resources and an increased cost. Moreover, though this technology avoids the procedure of sustained and complicated comparisons of all time mark signals in the conventional time mark method, the efficiency of the chips still needs to be consumed to perform a large quantity of subtraction computation and comparison procedures.

SUMMARY OF THE INVENTION

The present invention provides a radiation detection signal processing method and a radiation detection signal processing system, which present a new-type hybrid event coincidence detection system combining trigger signals and time marks. The system is divided into a time signal generating portion and a coincidence event identifying portion. In the time signal generating portion, pulse discrimination circuits and TDCs form a hybrid time signal circuit to generate trigger signals and a set of time marks representing time differences between adjacent events, and these signals are merged into a hybrid time signal. In the coincidence event identifying portion, a trigger signal AND logic method is used in a preliminary filtering stage, and for paired modules after the filtering, a time mark representing a time difference between two events is used to finally identify a coincidence event. Besides, the radiation detection signal processing system of the present invention may also be a tomography system.

The present invention provides a radiation detection signal processing method and a radiation detection signal processing system, which only need one set of TDCs in a hybrid time signal circuit to complete operation of event time differences of multiple detectors. Therefore, the quantity of chips used in the system is reduced, thereby dramatically reducing the cost, and the problem of time synchronization and numerical value correction among TDCs in a hybrid architecture in the prior art is avoided. The present invention also simplifies a signal processing flow of the system. Therefore, for real time operation, the present invention has the merits of real time performance, fast implementation and high integration, as compared with the hybrid method in the prior art, which firstly performs event coincidence preliminary filtering by a trigger signal AND logic method, and then performs time mark subtraction computation and coincidence event identification. A new hybrid time signal consists of a set of time marks and a plurality of trigger signals. The system does not need a large amount of memory space to temporarily store the time marks, and a bit number of a transmission flat cable is reduced, so that the number of pins required by a chip of the hybrid event coincidence detection circuit is decreased. The time marks are already time differences among the events. Therefore, in the hybrid event coincidence detection circuit, sustained event time sorting and time mark subtraction computation do not need to be performed by consuming chip resources, which improves the event coincidence detection speed, reduces resources required by the chip, and makes it more flexible to select a chip.

The radiation detection signal processing method and system provided by the present invention have the high detection accuracy of the hybrid method and the time mark method in the prior art, and meanwhile, reduce the complexity of the system circuit, the circuit volume, and the number of chips used, and improve the real time performance and the integration of the system.

In an embodiment, the present invention provides a radiation detection signal processing method, which comprises: providing a radiation detection signal processing system having a plurality of front-end detectors, where each front-end detector detects a radiation event to generate a corresponding energy signal; generating a corresponding trigger signal according to the corresponding energy signal; generating a first signal and a second signal according to all trigger signals; and obtaining time differences among the trigger signals according to the first signal and the second signal, converting the time differences into a set of time marks, merging all of the trigger signals and the set of time marks into a hybrid time signal, and transmitting the hybrid time signal to a hybrid event coincidence detection circuit.

In another embodiment, the present invention further provides a radiation detection signal processing system, which comprises: a plurality of front-end detectors, used for respectively detecting a radiation event to generate a corresponding energy signal; a plurality of event identification apparatuses, coupled with the plurality of front-end detectors, and used for respectively receiving the energy signal to generate a corresponding trigger signal; a logic operation circuit, coupled with the plurality of event identification apparatuses, and used for receiving all trigger signals to generate a first signal and a second signal; and a TDC, coupled with the logic operation circuit, and used for receiving the first signal and the second signal, obtaining time differences among the trigger signals according to the first signal and the second signal, converting the time differences into a set of time marks, merging all of the trigger signals and the set of time marks into a hybrid time signal, and transmitting the hybrid time signal to a hybrid event coincidence detection circuit.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

In order to make the features, objectives, and efficacies of the present invention comprehensible to the examiner, a related detailed structure and a design concept and principle of an apparatus of the present invention are particularly illustrated below, so that the examiner may better understand the characteristics of the present invention, which are described in detail in the following.

Figure 1:
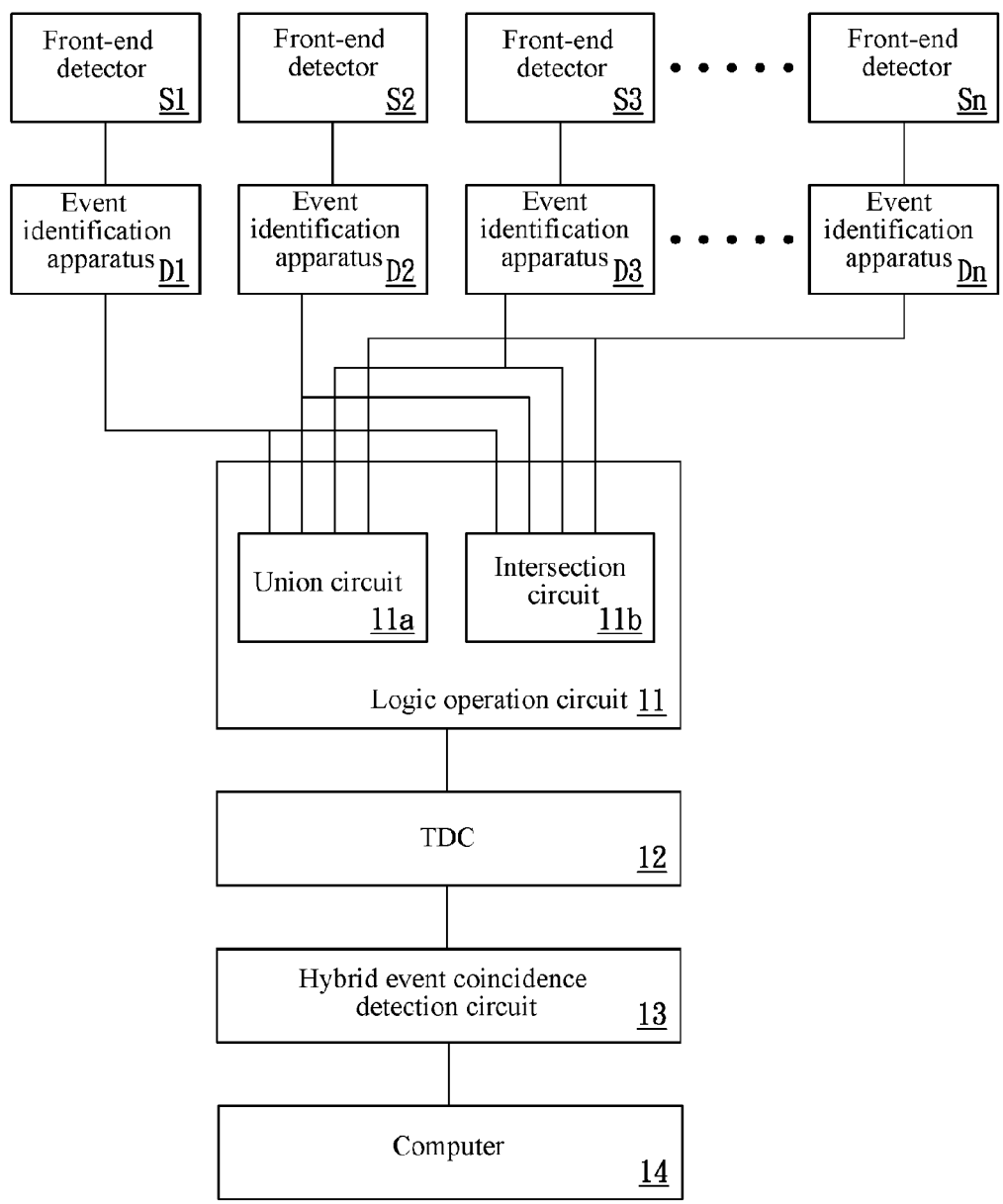
FIG. 1 is a schematic diagram of an embodiment of a radiation detection signal processing system in the present invention.

FIG. 1 is a schematic diagram of an embodiment of a radiation detection signal processing system of the present invention. The radiation detection signal processing system 1 includes: a plurality of front-end detectors S1 to Sn, a plurality of event identification apparatuses D1 to Dn, a logic operation circuit 11, a TDC 12 and a hybrid event coincidence detector 13. The plurality of front-end detectors S1 to Sn respectively detects a radiation event to generate a corresponding energy signal through photoelectric conversion, where the radiation event is a γ-ray. The plurality of event identification apparatuses D1 to Dn is coupled with the plurality of front-end detectors, and respectively receives the energy signal to generate a corresponding trigger signal representing the instant when the γ-ray is detected. The plurality of event identification apparatuses D1 to Dn adjusts to make all trigger signals have the same pulse width, and the plurality of event identification apparatuses may be pulse discrimination circuits (for example, constant fraction discriminators (CFDs)) or level triggers. The logic operation circuit 11 is coupled with the plurality of event identification apparatuses, and receives all of the trigger signals to generate a first signal and a second signal. The TDC 12 is coupled with the logic operation circuit, receives the first signal and the second signal, obtains time differences among the trigger signals according to the first signal and the second signal, converts the time differences into a set of time marks, merges all of the trigger signals and the set of time marks into a hybrid time signal, and transmits the hybrid time signal to the hybrid event coincidence detection circuit 13. In more detail, the TDC 12 may obtain a time mark representing an accurate time difference between two γ-rays successively received by the system, and the time mark is a numerical value. The foregoing logic operation circuit 11 further includes: a union circuit 11a, coupled with the plurality of event identification apparatuses D1 to Dn, and used for performing a union operation on all of the trigger signals to generate the first signal; and an intersection circuit 11b, coupled with the plurality of event identification apparatuses D1 to Dn, and used for performing an intersection operation on all of the trigger signals to generate the second signal. Besides, after receiving the hybrid time signal, the foregoing hybrid event coincidence detection circuit 13 may perform works, such as coincidence event identification, pairing information encoding and pairing data merging, so as to transmit, through a data transmission interface (not shown), a result to a computer 14 for imaging processing. Besides, the radiation detection signal processing system in the present invention may also be a tomography system.

Figure 2:
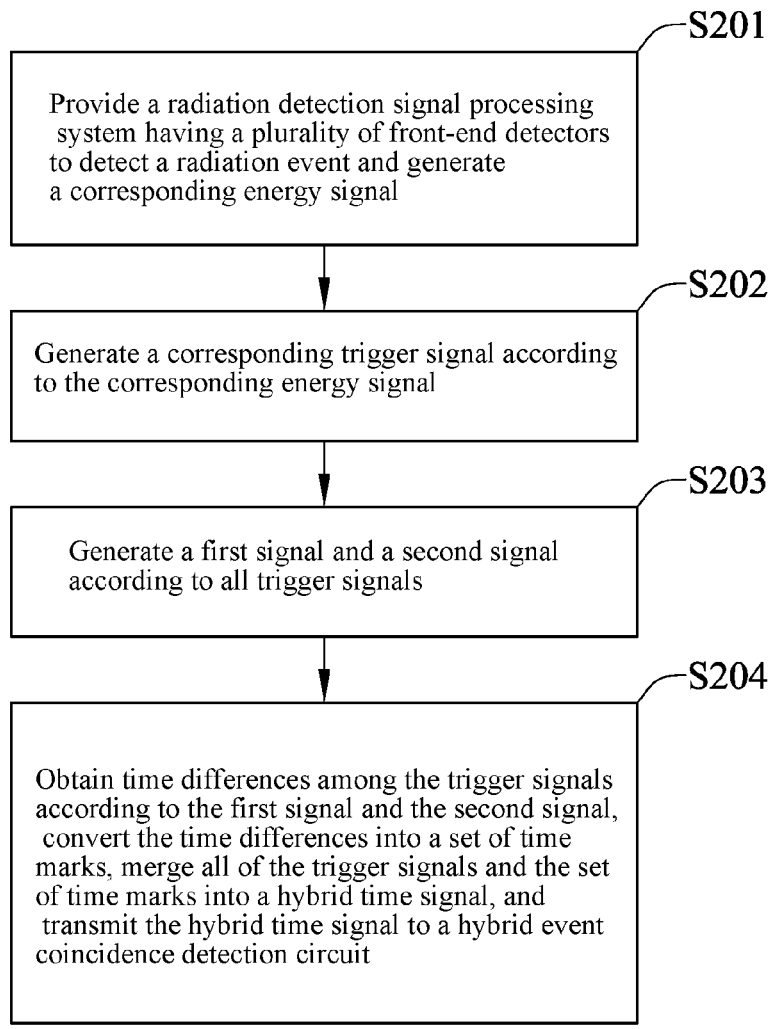
FIG. 2 is a schematic flow chart of an embodiment of a radiation detection signal processing method in the present invention.

FIG. 2 is a schematic flow chart of an embodiment of a radiation detection signal processing method in the present invention. The radiation detection signal processing method includes: firstly, providing a radiation detection signal processing system 1 having a plurality of front-end detectors S1 to Sn, where each front-end detector detects a radiation event to generate a corresponding energy signal through photoelectric conversion (Step s201), and the radiation event is a γ-ray; generating, according to the corresponding energy signal, a corresponding trigger signal representing the instant when the γ-ray is detected (Step s202), where all trigger signals have the same pulse width; generating a first signal and a second signal according to all of the trigger signals (Step s203), where in this embodiment, a union operation may be performed on all of the trigger signals to generate the first signal, and an intersection operation may be performed on all of the trigger signals to generate the second signal; and obtaining time differences among the trigger signals according to the first signal and the second signal, converting the time differences into a set of time marks, merging all of the trigger signals and the set of time marks into a hybrid time signal, and transmitting the hybrid time signal to a hybrid event coincidence detection circuit 13 (Step s204). Besides, the method further includes: performing coincidence event identification, pairing information encoding and pairing data merging according to the hybrid time signal, and transmitting a result to a computer for imaging processing.

Figure 3:
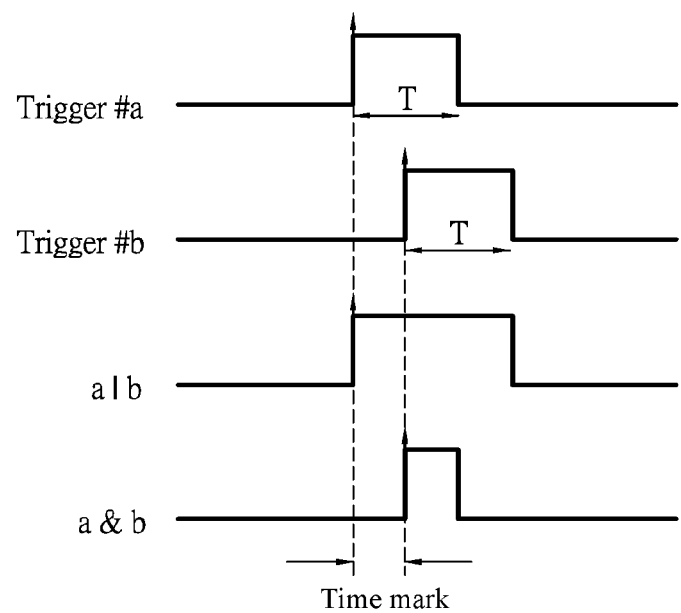
FIG. 3 shows an embodiment of an application of the present invention.

FIG. 3 shows an embodiment of an application of the present invention. Referring to FIG. 3, an example that two sets of detectors in the plurality of front-end detectors S1 to Sn of the present invention are used is taken to illustrate a computing method of a time mark. Trigger a and Trigger b respectively represent two trigger signals obtained by front-end detectors a and b through pulse discrimination circuits, and the pulse widths thereof are both T. The two trigger signals are separated into two paths, and a union (a|b) operation and an intersection (a & b) operation are respectively performed on the trigger signals to obtain a signal U and a signal I. By inputting the two signals into the TDC 12, a time mark representing a time difference between the two trigger signals is obtained. After that, Trigger a, Trigger b and the time mark are merged into a set of hybrid time signals for being transmitted to the hybrid coincidence event identification circuit 13.

In details, in the radiation detection signal processing system 1 of the present invention, front-end detector modules meeting the requirement of the system are firstly paired and combined. The pairing and combining method may preset a critical value to select a paired combination. Subsequently, trigger signals output by these paired modules are detected by using an "AND" logic gate to see whether the trigger signals are simultaneously generated. An approach is to connect trigger signals of two paired modules in each combination through an AND logic gate, and only when the two paired trigger signals are both at high levels, the AND logic gate produces a high level to determine this pair passes preliminarily estimated identification. Only event information that passes the preliminarily estimated identification may enter a next stage, and accurate coincidence event identification is performed thereon according to the time mark. If a numerical value of the time mark enters a preset range of the system, the pair is identified as a coincidence event. Finally, works, such as pairing information encoding, multiple event identification and coincidence event data merging, are completed according to a coincidence event identification result.

The hybrid architecture designed by the present invention simplifies a signal processing flow of the conventional hybrid architecture, and only one set of TDCs is needed to complete operations of event time differences of multiple detectors. Compared with the prior art, the number of TDCs used is dramatically decreased, so that the number of chips required is largely reduced, the cost of the circuit is lowered, and the problem of synchronization and correction when multiple sets of TDCs are used is also avoided. The obtained hybrid time signal consists of a set of time marks and multiple trigger signals. A large amount of memory space is not needed to temporarily store the time marks, and a bit number of a transmission flat cable is reduced, so that the number of pins required by a chip of the hybrid event coincidence detection circuit is decreased. The time marks are already the time differences among the events. Therefore, in the hybrid event coincidence detection circuit, sustained event time sorting and time mark subtraction computation do not need to be performed by consuming chip resources, which improves the event coincidence detection speed, reduces resources required by the chip, and makes it more flexible to select a chip.

Accordingly, the present invention may be implemented by a system consisting of an electronic circuit and FPGA chips, so as to complete a radiography system having a new hybrid architecture, and apply the system to an existing PET scanner.

The above illustration is only the embodiments of the present invention, and is not provided to limit the scope of the present invention. Equivalent changes and modifications made according to the appended claims of the present invention do not deviate from the core idea of the present invention, nor go beyond the spirit and the scope of the present invention, and should be regarded as further implementations of the present invention.

What is claimed is:

1. A radiation detection signal processing method, comprising:
   providing a radiation detection signal processing apparatus having a plurality of front-end detectors, wherein each front-end detector detects a radiation event to generate a corresponding energy signal;
   generating a corresponding trigger signal according to the corresponding energy signal;
   generating a first signal and a second signal according to all trigger signals; and
   obtaining time differences among the trigger signals according to the first signal and the second signal, converting the time differences into a set of time marks, merging all of the trigger signals and the set of time marks into a hybrid time signal, and transmitting the hybrid time signal to a hybrid event coincidence detection circuit.

2. The radiation detection signal processing method according to claim 1, further comprising:
   pairing and combining the plurality of front-end detectors.

3. The radiation detection signal processing method according to claim 1, wherein all of the trigger signals have the same pulse width.

4. The radiation detection signal processing method according to claim 1, further comprising:
   performing a union operation on all of the trigger signals to generate the first signal; and
   performing an intersection operation on all of the trigger signals to generate the second signal.

5. The radiation detection signal processing method according to claim 1, further comprising:
   performing coincidence event identification, pairing information encoding and pairing data merging according to the hybrid time signal, and transmitting a result to a computer for imaging processing.

6. A radiation detection signal processing system, comprising:
   a plurality of front-end detectors, used for respectively detecting a radiation event to generate a corresponding energy signal;
   a plurality of event identification apparatuses, coupled with the plurality of front-end detectors, and used for respectively receiving the energy signal to generate a corresponding trigger signal;

a logic operation circuit, coupled with the plurality of event identification apparatuses, and used for receiving all trigger signals to generate a first signal and a second signal; and a time-to-digital converter (TDC), coupled with the logic operation circuit, and used for receiving the first signal and the second signal, obtaining time differences among the trigger signals according to the first signal and the second signal, converting the time differences into a set of time marks, merging all of the trigger signals and the set of time marks into a hybrid time signal, and transmitting the hybrid time signal to a hybrid event coincidence detection circuit.

7. The radiation detection signal processing system according to claim 6, wherein the plurality of event identification apparatuses adjusts to make all of the trigger signals have the same pulse width.

8. The radiation detection signal processing system according to claim 6, wherein the logic operation circuit further comprises:

a union circuit, coupled with the plurality of event identification apparatuses, and used for performing a union operation on all of the trigger signals to generate the first signal; and an intersection circuit, coupled with the plurality of event identification apparatuses, and used for performing an intersection operation on all of the trigger signals to generate the second signal.

9. The radiation detection signal processing system according to claim 6, wherein the plurality of event identification apparatuses is pulse discrimination circuits or level triggers.

10. The radiation detection signal processing system according to claim 6, wherein after receiving the hybrid time signal, the hybrid event coincidence detection circuit performs coincidence event identification, pairing information encoding and pairing data merging, and transmits a result to a computer for imaging processing.

* * * * *